(12) United States Patent
Hoffmann et al.

(10) Patent No.: US 7,676,738 B2
(45) Date of Patent: Mar. 9, 2010

(54) SCENARIO-DEPENDENT EVALUATION FORMULA

(75) Inventors: Michael Hoffmann, Salem, MA (US); J. Craig Cleaveland, Windham, NH (US)

(73) Assignee: Whitebirch Software, Inc., Salem, MA (US)

( * ) Notice: Subject to any disclaimer, the term of this patent is extended or adjusted under 35 U.S.C. 154(b) by 1180 days.

(21) Appl. No.: 11/224,761

(22) Filed: Sep. 13, 2005

(65) Prior Publication Data

US 2006/0059417 A1 Mar. 16, 2006

Related U.S. Application Data

(60) Provisional application No. 60/609,118, filed on Sep. 13, 2004.

(51) Int. Cl.
G06F 17/10 (2006.01)
G06F 17/11 (2006.01)

(52) U.S. Cl. .................. 715/213; 715/212; 715/219; 715/267

(58) Field of Classification Search .............. 715/212, 715/213, 219, 267
See application file for complete search history.

(56) References Cited

U.S. PATENT DOCUMENTS

| | | | |
|---|---|---|---|
| 5,371,675 A | 12/1994 | Greif et al. | 364/419.1 |
| 5,499,180 A | 3/1996 | Ammirato et al. | 364/419.1 |
| 5,727,161 A | 3/1998 | Purcell, Jr. | 395/207 |
| 5,806,078 A * | 9/1998 | Hug et al. | 715/205 |
| 6,199,078 B1 * | 3/2001 | Brittan et al. | 715/234 |
| 6,292,810 B1 | 9/2001 | Richards | 707/503 |
| 6,610,106 B1 * | 8/2003 | Jenks | 715/205 |
| 6,742,162 B2 * | 5/2004 | Bennett | 715/217 |
| 6,961,898 B2 * | 11/2005 | Bennett | 715/212 |
| 7,120,866 B2 * | 10/2006 | Kotler et al. | 715/209 |
| 2002/0007372 A1 | 1/2002 | Bauchot et al. | 707/503 |
| 2002/0023105 A1 * | 2/2002 | Wisniewski | 707/503 |
| 2002/0055948 A1 * | 5/2002 | Breuer et al. | 707/500 |
| 2002/0055953 A1 | 5/2002 | Tesch et al. | 707/504 |
| 2002/0091728 A1 * | 7/2002 | Kjaer et al. | 707/503 |
| 2002/0169799 A1 | 11/2002 | Voshell | 707/503 |

OTHER PUBLICATIONS

Competitive Analysis of Projected Financials Software, prepared by Lyn Millner, CPA, Lyn Rose Millner, Inc., 2125 N. 14th Avenue, Hollywood, FL 33020, 28 pgs, 2002.
CPS Competitors Analysis, source(s): http:/www.financeadvisor.com/finadv/competitors_note.shtml, 2004.
The Spheresoft Modeler, "The Latest Evolution in Spreadsheets", file:///C|/Documents%20and%20 Settings/spojunas/Desktop/Spheresoft%20Modeler%20for%Microsoft%20Excel.htm, 5 pgs, 2005.

* cited by examiner

*Primary Examiner*—Adam L Basehoar
*Assistant Examiner*—Yasin Patterson
(74) *Attorney, Agent, or Firm*—Bruce D. Rubenstein

(57) ABSTRACT

Software is disclosed that creates a way of controlling alterations to cell contents of a data flow network so they can easily be turned on and off as separate layers. These layers can then be grouped as scenarios. Scenarios allow different layers of formula changes to be easily added and removed from the model.

27 Claims, 5 Drawing Sheets

SCENARIO-DEPENDENT EVALUATION FORMULA

CROSS-REFERENCE TO RELATED APPLICATIONS

This application claims priority to U.S. Provisional Patent Application No. 60/609,118, filed on Sep. 13, 2004.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISK

Not Applicable.

REFERENCE TO A "MICROFICHE APPENDIX"

Not Applicable.

BACKGROUND OF THE INVENTION

1. Field of the Invention

This invention relates generally to computational modeling, and, more particularly, to computer modeling of alternative financial scenarios.

2. Description of Related Art

Every business, irrespective of its age and size, must at one time or another perform financial planning as a critical activity for managing cash flow and communicating the financial health of the business. For new businesses, the preparation of financial projections is integral to the business planning process. For larger companies, financial planning forms part of annual budgeting and plays an important role in long-term planning, business appraisals, and corporate development.

Central to financial planning and analysis is the construction of complex mathematical models that can reflect finances, activities, and other business factors such as external economic and/or environmental factors. A simple model such as "Sales minus Costs equals Profits" (i.e., S–C=P, expressed as a formula) is used to derive projected profits from assumptions about future sales and costs. In practice, financial planning models are highly complex as they must accommodate multiple time periods (months, quarters and years) and handle hundreds of variables relating to sales, costs, and other subjective business factors. When visualized as a multi-dimensional array of information (data) and computations (formulas), the volume accumulates very quickly. A very large number of variables may be required to generate a set of complex financial projections.

Common software tools that are used to manage such complex financial planning models include spreadsheet programs and proprietary accounting software tools with fixed (static) computational formulas and outputs.

Conventional financial planning models are used for many purposes, including constructing and comparing financial scenarios, performing sensitivity analyses, and comparing model results against actual results. Traditionally, in spreadsheets, this is accomplished by altering the formulas of result cells. However, if one forgets to change cells' formulas back to their original contents, the model becomes permanently altered. Sometimes, the model will be copied and then altered. However, maintaining multiple models in a consistent manner is difficult. Either way, traditional approaches can, and often do, compromise the integrity of the computation model.

BRIEF SUMMARY OF THE INVENTION

In accordance with an embodiment of the invention, software creates a way of controlling alterations to cell contents of a data flow network so they can easily be turned on and off as separate layers. These layers can then be grouped as scenarios. Scenarios allow different layers of formula changes to be easily added and removed from the model.

In accordance with one aspect of the invention, a system for providing alternative computational results in a computer-implemented model includes cells each representing a piece of data in the computational model. The system further includes formulas for each cell, which indicate alternative values of the respective cell. The system also includes layers, which group together formulas from different cells. Software is provided for selectively enabling and disabling the formulas on a layer-by-layer basis. The software operates to produce one value for each cell at a time.

In accordance with another aspect of the invention, a system provides alternative computational results in a computer-implemented model. The system includes cells each representing a piece of data in the computational model. For each cell, the system includes formulas indicate alternative values of the respective cell. The system includes software for selectively enabling and disabling each of the formulas. The formulas for each of the cells are nested, and each formula acts upon the value of any formulas nested within it to produce a single value for each cell at a time.

In accordance with yet another aspect of the invention, a software system for providing alternative computational results in a computer-implemented financial model includes a plurality of cells, each representing a piece of financial data in a financial model. For each cell, the software system includes formulas for prescribing alternative values of the respective cell. The formulas are arranged in an ordered set for which the value of a formula occurring later in the set is computable based upon the value of a formula occurring earlier in the set. Each of the formulas is selectable for prescribing a single value for the respective cell.

In accordance with yet another aspect of the invention, software provides alternative computational results in a computer-implemented model. The software includes a plurality of cells. The software includes, for each cell, means for prescribing a plurality of alternative values for the cell and means for selecting one value from among the alternative values of the cell. The software further includes means for organizing selected alternative values into a scenario and means for providing different scenarios representing different groupings of alternative values.

In accordance with yet another aspect of the invention, a method provides alternative computational results in a computer-implemented model. The method includes prescribing, for each of a number of cells, formulas indicating alternative values of the respective cell. For each cell, the formulas are arranged in an ordered set wherein each formula has a location. Formulas are grouped together from different cells having the same locations in the respective ordered sets to form layers. The method includes selectively enabling different layers to model financial data under different scenarios.

In accordance with yet another aspect of the invention, a method provides alternative computational results in a computer-implemented model. The method includes prescribing, for each of a number of cells, formulas indicating alternative values of the respective cell. The method groups together formulas from different cells to form multiple ordered layers. Different layers are selectively enabled to model financial data under different scenarios.

BRIEF DESCRIPTION OF THE DRAWINGS

Various aspects of the invention will become apparent from a consideration of the ensuing description and drawings, in which.

DETAILED DESCRIPTION OF THE INVENTION

Software according to an embodiment of the invention creates a new way of controlling alterations to cell contents so they can easily be turned on and off as separate layers. These layers can then be grouped as scenarios. Scenarios allow different layers of formula changes (also referred to as "tweaks") to be easily added and removed from the model. Model comparisons are easily made and controlled with software by keeping all formula definitions and tweaks separated and organized as layers and scenarios. Thus, no permanent changes to a model can be inadvertently made.

This software invention is based on a data flow network. A data flow network, in simple terms, examines processes (activities that transform data from one form to another, such as formulas), data stores (the holding areas for data, such as cells organized as table rows and columns), external entities (what sends data into a system or receives data from a system), and data flows (routes by which data can flow).

Figure 1:
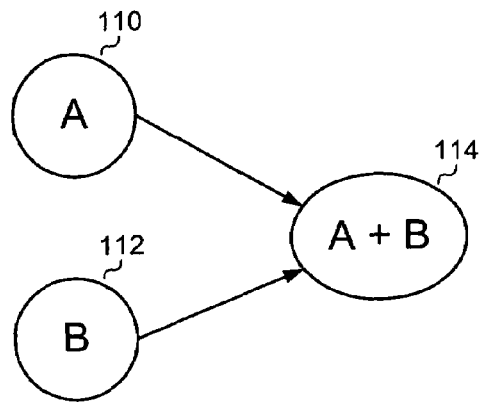
FIG. 1 is a data flow diagram that shows formulas in cells of a data flow network referencing other cells, according to the prior art.

In a typical spreadsheet type data flow network, each cell has a formula for computing a value. Formulas may include constants, operators, functions, and non-circular references to other cells. The network of cells can be visualized as a two dimensional data flow diagram where each cell, X, is a node with inputs from other nodes and outputs to other nodes whose formulas may refer to cell X, Each cell X may have Z number of layered formulas. The diagram must be non-circular to avoid computational loops. A typical two dimension example of a data flow network can be seen in FIG. 1. In this example, cell C is the sum of cells A and B.

"Tweakable" Formulas

According to the invention, tweakable formulas provide a three-dimensional layered data flow network. Each cell may have Z number of formulas whose results may be defined by one or more formulas arranged in the same (or different) layers. Layers are created with ordered sets of formulas: (f1, f2, f3, . . . , fn} Each formula may refer to the result of a previous formula. The value of each cell is the result of a previous formula.

Figure 2:
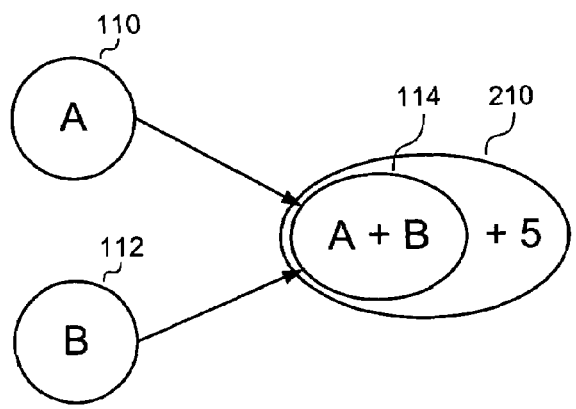
FIGS. 2-3 are data flow diagrams that show nested or layered formulas according to an embodiment of the invention.

An example is shown in FIG. 2. In that figure cell C has two tweak formulas, the first is the sum of cells A and B (like before) and the second tweak formula adds 5 to the result. Each tweak formula in the example below is represented as a nested (or layered) circle or oval.

Figure 3:
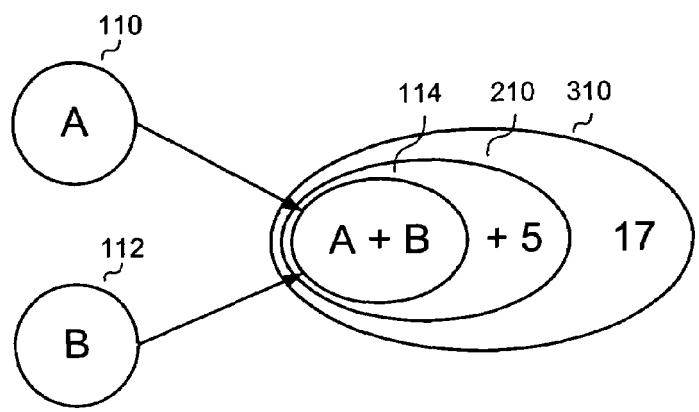
Figure 4:
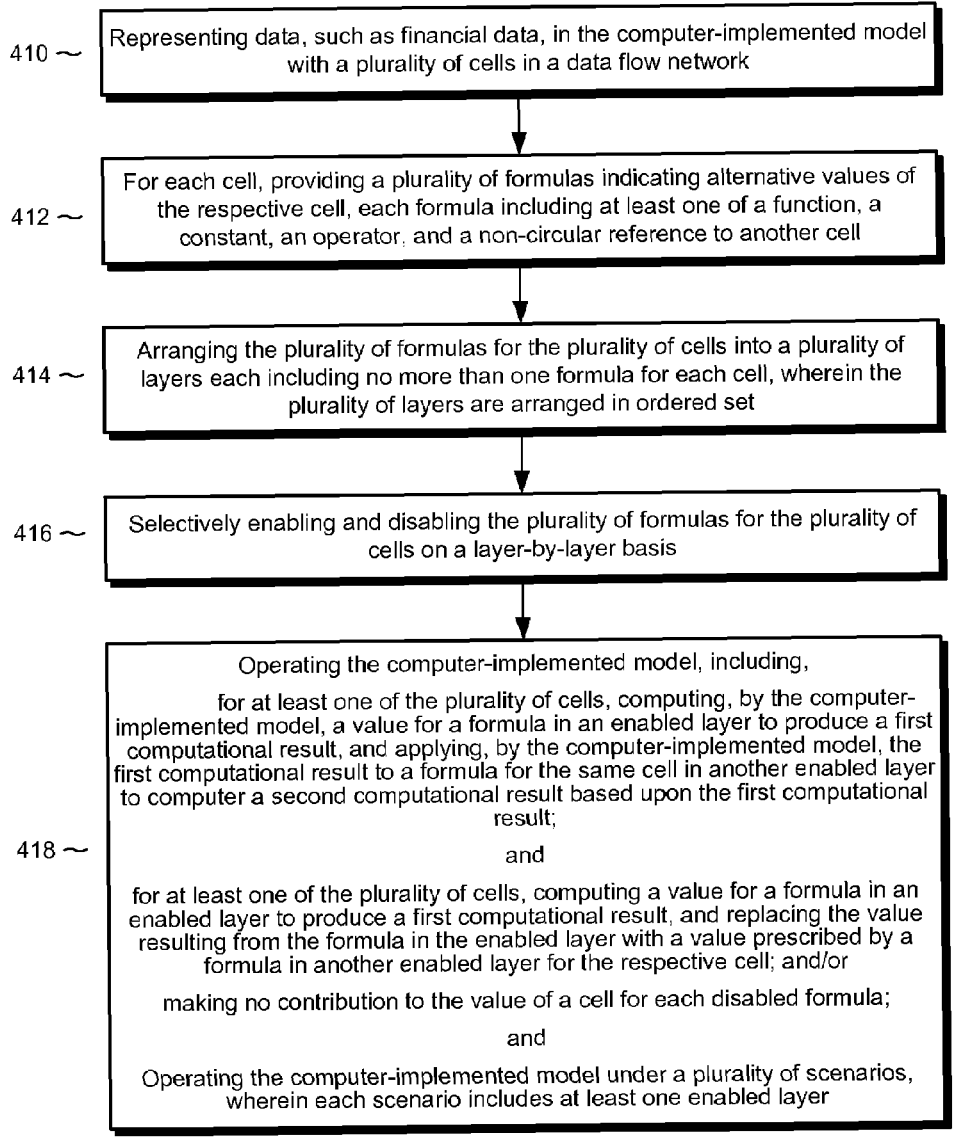
FIG. 4 is a flowchart showing a process for modeling data according to one embodiment of the invention.
Figure 5:
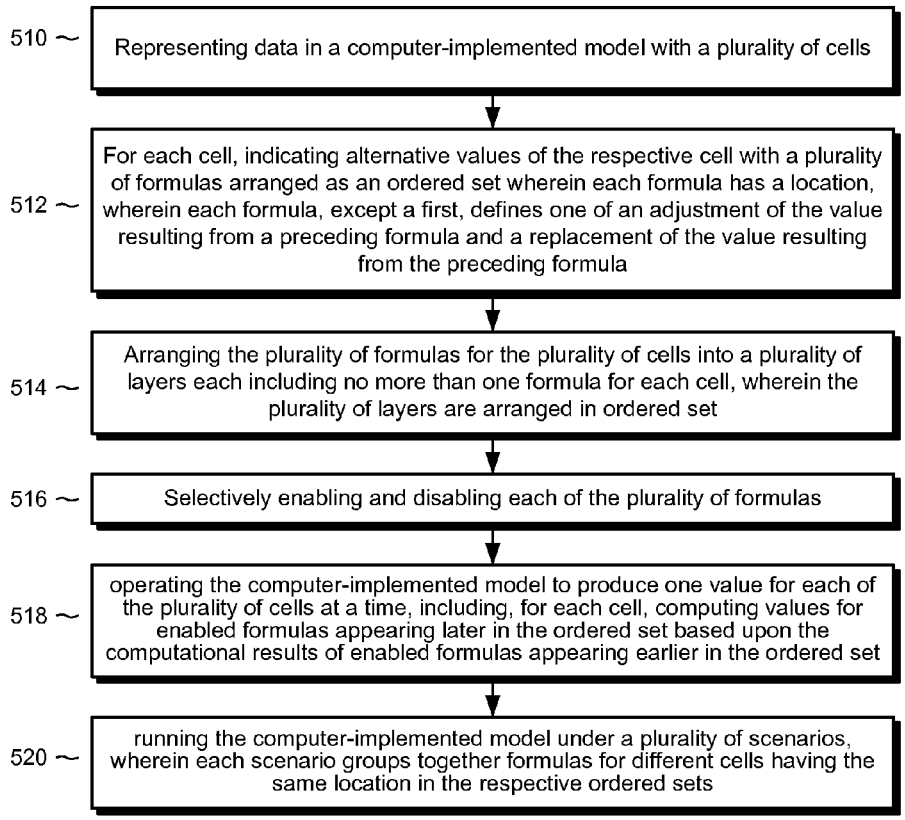
FIG. 5 is a flowchart showing a process for modeling data according to another embodiment of the invention.
Figure 6:
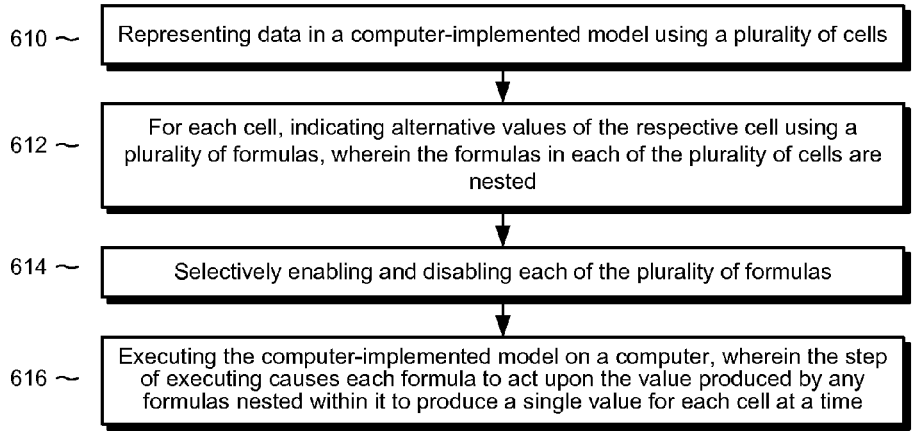
FIG. 6 is a flowchart showing a process for modeling data according to yet another embodiment of the invention.
Figure 7:
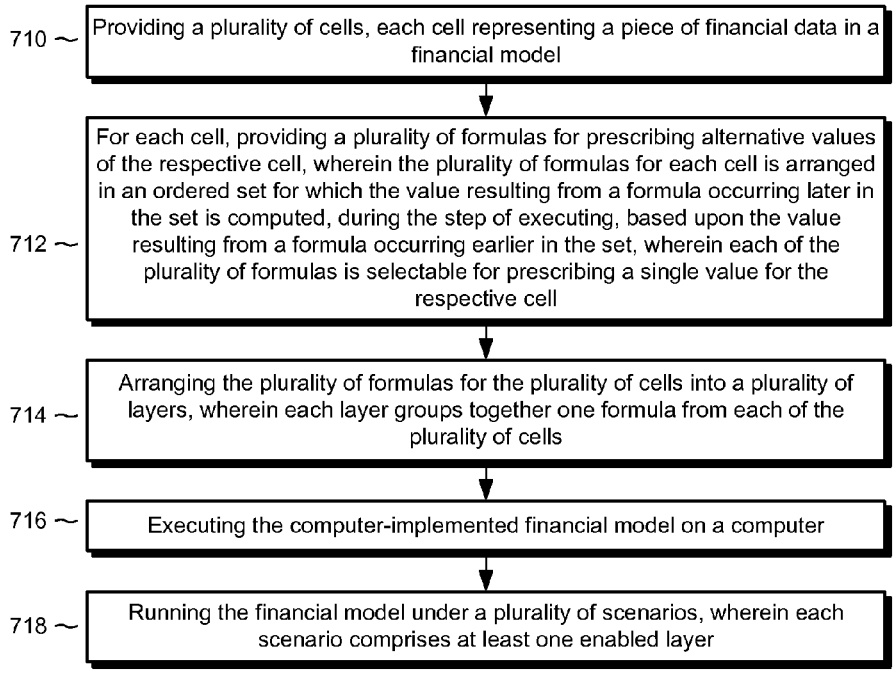
FIG. 7 is a flowchart showing a process for modeling data according to still another embodiment of the invention.
Figure 8:
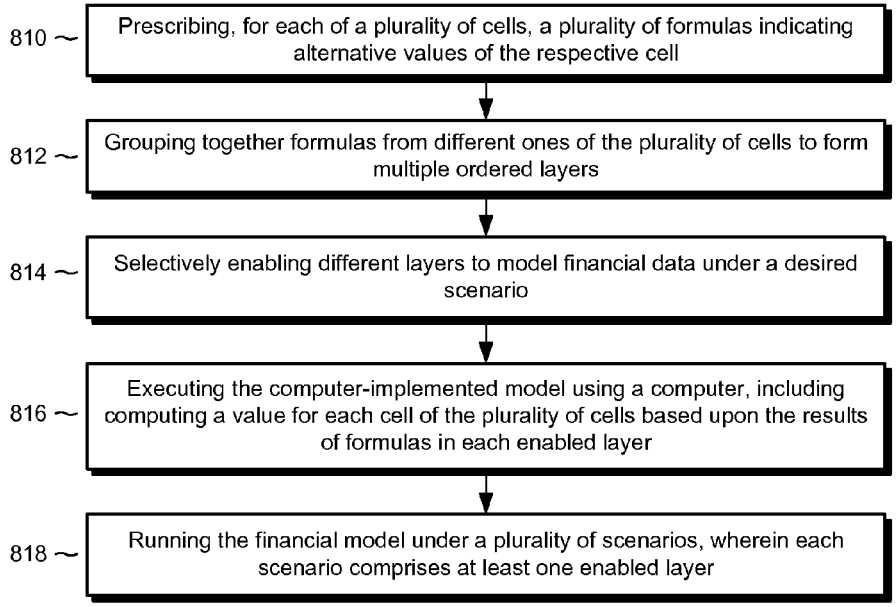
FIG. 8 is a flowchart showing a process for modeling data according to an additional embodiment of the invention.
Figure 9:
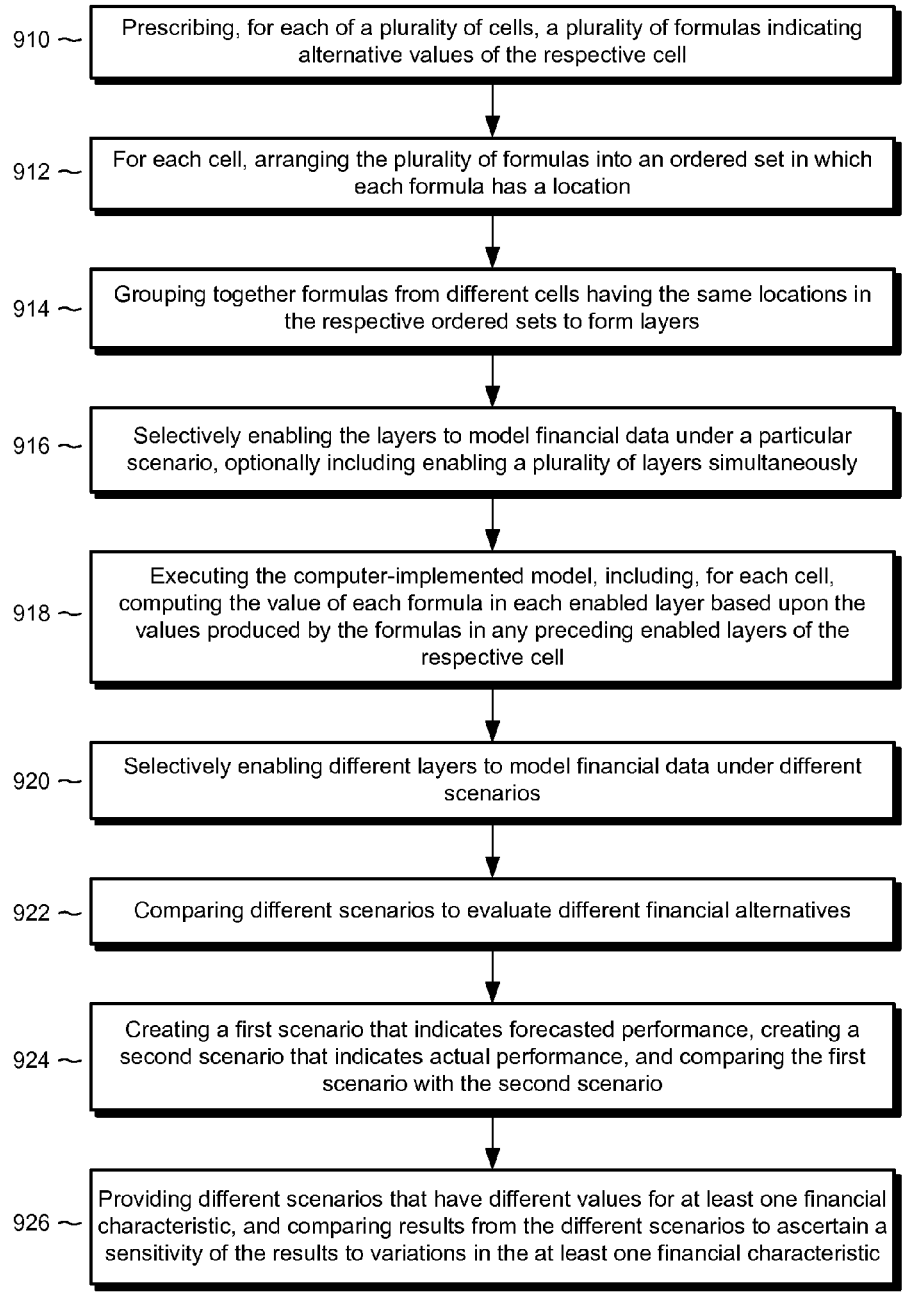
FIG. 9 is a flowchart showing a process for modeling data according to a further embodiment of the invention.

FIG. 3 shows two important things. First, that tweak formulas can be layered or nested any number of times. Second, the outermost tweak formula shows a replacement of a value rather than an adjustment like the middle (or second) tweak formula. The outermost (or third) tweak formula is just a constant, 17, which replaces A+B or A+B+5. This example is typical of situations where one wishes to include actual results, which replace the results from the formula.

Each layer of tweak formulas may be turned on and off, which makes it possible for cells to have many different alternative results depending on which tweak formulas are on or off. In the example above if, the second tweak and third tweaks are turned off, the cell will produce the original result value of A+B. However, if the second tweak formula is turned on then the result value is A+B+5, or if the third tweak is turned on then the result value will be 17.

Layers

As previously mentioned, tweaks must be ordered so that only one value can be computed. The ordering can be accomplished in any number of ways. In projected financials, we use layers. Other systems might use alternative ordering mechanisms. In projected financials, layers are also used to indicate which tweaks are turned on or off.

When a layer is turned off, then all tweaks in that layer are turned off. This allows the user to use layers to represent various events in natural ways.

For example, an event "expenses are 8% higher" can be described as a set of tweaks, one for each cell representing an expense, that multiplies the previous result by 1.08. If this layer is turned on, then all expense cells will be 8% higher, and if turned off, the expenses are unchanged. A second layer, called "New Computer," might be used to represent the purchase of a new computer in the month of June. It would consist of a set of tweak formulas that would express all the information related to the purchase, including such things as depreciation, accounts payable, etc.

Scenarios

Layers can be combined in arbitrary ways to create different scenarios. For example, scenario A might turn on higher expenses and "New Computer" whereas scenario B might turn both of them off. Note that turning layers on or off does not change the underlying model, only how the numbers are computed. Using tweaks and layers will preserve the integrity of the model because instead of altering the model, a new layer is "wrapped" around the model, and this layer can be easily turned on or off as needed.

The software according to the invention allows model results and actual results co-exist in the same context (i.e. data flow network), and ensures that actual results flow smoothly into model results. This software can be used for many purposes, including, but not limited to, constructing and comparing financial scenarios, performing sensitivity analysis, and comparing model results against actual results.

As used throughout this document, the words "comprising," "including," and "having" are intended to set forth certain items, steps, elements, or aspects of something in an open-ended fashion. Unless a specific statement is made to the contrary, these words do not indicate a closed list to which additional things cannot be added.

Having described one embodiment, numerous alternative embodiments or variations can be made. Those skilled in the art will therefore understand that various changes in form and detail may be made to the embodiments disclosed herein without departing from the scope of the invention hereof.

What is claimed is:

1. A method for providing alternative computational results in a computer-implemented model, comprising:
   representing data in the computer-implemented model with a plurality of cells;
   for each cell, providing a plurality of formulas indicating alternative values of the respective cell;
   arranging the plurality of formulas for the plurality of cells into a plurality of layers each including no more than one formula for each cell, wherein the plurality of layers are arranged in an ordered set;
   selectively enabling and disabling the plurality of formulas for the plurality of cells on a layer-by-layer basis; and
   operating the computer-implemented model, including, for at least one of the plurality of cells,
      computing, by the computer-implemented model, a value for a formula in an enabled layer to produce a first computational result, and
      applying, by the computer-implemented model, the first computational result to a formula for the same cell in another enabled layer to compute a second computational result based upon the first computational result.

2. The method as recited in claim 1, wherein each layer groups together a single formula from each of the plurality of cells.

3. The method as recited in claim 1,
   wherein, for each of the plurality of cells, each of the plurality of formulas has an enumerated location in the ordered set, and
   wherein each layer groups together formulas from different cells having the same enumerated location in the ordered set.

4. The method as recited in claim 1, wherein the step of operating the computer-implemented model further comprises, for at least one of the plurality of cells,
   computing, by the computer-implemented model, a value resulting from a formula in an enabled layer for each respective cell to produce a computational result, and
   replacing the value resulting from the formula in the enabled layer with a value prescribed by a formula in another enabled layer for the respective cell.

5. The method as recited in claim 1, wherein the step of operating the computer-implemented model comprises making no contribution to the value of a cell for each disabled formula.

6. The method as recited in claim 1, wherein the step of operating the computer-implemented model comprises operating the computer-implemented model under a plurality of scenarios, wherein each scenario comprises at least one enabled layer.

7. The method as recited in claim 6, wherein each scenario comprises a plurality of enabled layers.

8. The method as recited in claim 1, wherein each of the plurality of formulas for the plurality of cells includes at least one of a function, a constant, an operator, and a non-circular references to another cell.

9. The method as recited in claim 1, further comprising:
   organizing enabled layers into a plurality of scenarios under which the computer-implemented model can be run.

10. The method as recited in claim 1, further comprising providing different scenarios for different groups of enabled layers.

11. The method as recited in claim 1, further comprising arranging formulas in one layer to computationally model a financial characteristic, and arranging formulas in another layer to indicate actual financial information for the financial characteristic.

12. The method as recited in claim 1, further comprising forming a financial model using the plurality of cells, and using the plurality of layers to specify alternative values that can be plugged into the financial model.

13. The method as recited in claim 1, further comprising organizing the plurality of cells in a data flow network.

14. A method for providing alternative computational results in a computer-implemented model, comprising:
   representing data in the computer-implemented model with a plurality of cells;
   for each cell, indicating alternative values of the respective cell with a plurality of formulas arranged as an ordered set wherein each formula has a location;
   selectively enabling and disabling each of the plurality of formulas; and
   operating the computer-implemented model to produce one value for each of the plurality of cells at a time, including, for each cell, computing values for enabled formulas appearing later in the ordered set based upon the computational results of enabled formulas appearing earlier in the ordered set.

15. The method as recited in claim 14, further comprising running the computer-implemented model under a plurality of scenarios, wherein each scenario groups together formulas for different cells having the same location in the respective ordered sets.

16. The method as recited in claim 14, wherein each formula, except a first, defines one of an adjustment of the value resulting from a preceding formula and a replacement of the value resulting from the preceding formula.

17. A method for providing alternative computational results in a computer-implemented model, comprising:
   representing data in the computer-implemented model using a plurality of cells;
   for each cell, indicating alternative values of the respective cell using a plurality of formulas;
   selectively enabling and disabling each of the plurality of formulas; and
   executing the computer-implemented model on a computer,
   wherein the formulas in each of the plurality of cells are nested, and
   wherein the step of executing causes each formula to act upon the value produced by any formulas nested within it to produce a single value for each cell at a time.

18. A method for providing alternative computational results in a computer-implemented financial model, comprising:
   providing a plurality of cells, each cell representing a piece of financial data in a financial model;
   for each cell, providing a plurality of formulas for prescribing alternative values of the respective cell; and
   executing the computer-implemented financial model on a computer,
   wherein the plurality of formulas for each cell is arranged in an ordered set for which the value resulting from a formula occurring later in the set is computed, during the step of executing, based upon the value resulting from a formula occurring earlier in the set, and wherein each of the plurality of formulas is selectable for prescribing a single value for the respective cell.

19. The method as recited in claim 18, further comprising arranging the plurality of formulas for the plurality of cells into a plurality of layers, wherein each layer groups together one formula from each of the plurality of cells.

20. The method as recited in claim 19, further comprising running the financial model under a plurality of scenarios, wherein each scenario comprises at least one enabled layer.

21. A method for providing alternative computational results in a computer-implemented model, comprising:
    prescribing, for each of a plurality of cells, a plurality of formulas indicating alternative values of the respective cell;
    for each cell, arranging the plurality of formulas into an ordered set in which each formula has a location;
    grouping together formulas from different cells having the same locations in the respective ordered sets to form layers;
    selectively enabling the layers to model financial data under a particular scenario; and
    executing the computer-implemented model, including, for each cell, computing the value of each formula in each enabled layer based upon the values produced by the formulas in any preceding enabled layers of the respective cell.

22. The method as recited in claim 21, further comprising: selectively enabling different layers to model financial data under different scenarios.

23. The method as recited in claim 21, wherein the step of selectively enabling comprises enabling a plurality of layers simultaneously.

24. The method as recited in claim 21, further comprising comparing different scenarios to evaluate different financial alternatives.

25. The method as recited in claim 21, further comprising:
    creating a first scenario that indicates forecasted performance;
    creating a second scenario that indicates actual performance; and
    comparing the first scenario with the second scenario.

26. The method as recited in claim 21, further comprising:
    providing different scenarios that have different values for at least one financial characteristic; and
    comparing results from the different scenarios to ascertain a sensitivity of the results to variations in the at least one financial characteristic.

27. A method for providing alternative computational results in a computer-implemented model, comprising:
    prescribing, for each of a plurality of cells, a plurality of formulas indicating alternative values of the respective cell;
    grouping together formulas from different ones of the plurality of cells to form multiple ordered layers;
    selectively enabling different layers to model financial data under a desired scenario; and
    executing the computer-implemented model using a computer, including computing a value for each cell of the plurality of cells based upon the results of formulas in each enabled layer.

* * * * *